US012321178B2

(12) United States Patent
da Silva et al.

(10) Patent No.: US 12,321,178 B2
(45) Date of Patent: Jun. 3, 2025

(54) SEMANTIC MODELS FOR ROBOT AUTONOMY ON DYNAMIC SITES

(71) Applicant: Boston Dynamics, Inc., Waltham, MA (US)

(72) Inventors: Marco da Silva, Waltham, MA (US); Dom Jonak, Winchester, MA (US); Matthew Klingensmith, Somerville, MA (US); Samuel Seifert, Waltham, MA (US)

(73) Assignee: Boston Dynamics, Inc., Waltham, MA (US)

( * ) Notice: Subject to any disclaimer, the term of this patent is extended or adjusted under 35 U.S.C. 154(b) by 54 days.

(21) Appl. No.: 17/648,942

(22) Filed: Jan. 26, 2022

(65) Prior Publication Data

US 2022/0244741 A1 Aug. 4, 2022

Related U.S. Application Data

(60) Provisional application No. 63/143,528, filed on Jan. 29, 2021.

(51) Int. Cl.
*G05D 1/00* (2024.01)
*B62D 57/032* (2006.01)
(Continued)

(52) U.S. Cl.
CPC ......... *G05D 1/0274* (2013.01); *B62D 57/032* (2013.01); *G01C 21/383* (2020.08);
(Continued)

(58) Field of Classification Search
CPC .. G05D 1/0274; G05D 1/0214; G05D 1/0276; G05D 2201/0207; G01C 21/383; G06V 20/50; B62D 57/032
See application file for complete search history.

(56) References Cited

U.S. PATENT DOCUMENTS 8,401,783 B2 3/2013 Hyung et al.
9,574,883 B2 2/2017 Watts et al.
(Continued)

FOREIGN PATENT DOCUMENTS

CN 116830061 9/2023
EP 4285199 A1 12/2023
(Continued)

OTHER PUBLICATIONS

Lee et al. "A New Semantic Descriptor for Data Association in Semantic SLAM", 2019 109th International Conference on Control, Automation and Systems (ICCAS), Jeju, Korea (South), 2019, pp. 1178-1181, doi: 10.23919/ICCAS47443.2019.8971639.
(Continued)

*Primary Examiner* — Kenneth J Malkowski
*Assistant Examiner* — Carville Albert Hollingsworth, IV
(74) *Attorney, Agent, or Firm* — Knobbe, Martens, Olson & Bear, LLP

(57) ABSTRACT

A method includes receiving, while a robot traverses a building environment, sensor data captured by one or more sensors of the robot. The method includes receiving a building information model (BIM) for the environment that includes semantic information identifying one or more permanent objects within the environment. The method includes generating a plurality of localization candidates for a localization map of the environment. Each localization candidate corresponds to a feature of the environment identified by the sensor data and represents a potential localization reference point. The localization map is configured to localize the robot within the environment when the robot moves throughout the environment. For each localization candidate, the method includes determining whether the respective feature corresponding to the respective localization candidate is a permanent object in the environment and
(Continued)

generating the respective localization candidate as a localization reference point in the localization map for the robot.

24 Claims, 8 Drawing Sheets

(51) Int. Cl.
    *G01C 21/00*     (2006.01)
    *G06V 20/50*     (2022.01)

(52) U.S. Cl.
    CPC ......... *G05D 1/0214* (2013.01); *G05D 1/0276* (2013.01); *G06V 20/50* (2022.01)

(56) References Cited

U.S. PATENT DOCUMENTS

| | | | |
|---|---|---|---|
| 9,844,879 | B1 | 12/2017 | Cousins et al. |
| 9,969,086 | B1* | 5/2018 | Whitman .............. B62D 57/032 |
| 10,639,794 | B2 | 5/2020 | Cousins et al. |
| 2018/0161986 | A1 | 6/2018 | Kee et al. |
| 2018/0328737 | A1 | 11/2018 | Frey et al. |
| 2018/0348742 | A1 | 12/2018 | Byrne et al. |
| 2019/0332114 | A1* | 10/2019 | Moroniti ............ G01C 21/3807 |
| 2020/0109954 | A1 | 4/2020 | Li et al. |
| 2020/0132472 | A1* | 4/2020 | Mittal ...................... G06F 16/29 |
| 2020/0174460 | A1 | 6/2020 | Byrne et al. |
| 2020/0258400 | A1 | 8/2020 | Yuan et al. |
| 2020/0386882 | A1* | 12/2020 | Klein ..................... G06Q 50/08 |
| 2021/0180961 | A1* | 6/2021 | Oh ........................ G05D 1/0214 |
| 2022/0063662 | A1* | 3/2022 | Sprunk .................. G06V 20/58 |
| 2024/0192695 | A1 | 6/2024 | Klingensmith et al. |

FOREIGN PATENT DOCUMENTS

| | | |
|---|---|---|
| KR | 10-2023-0137334 | 10/2023 |
| WO | WO 2022/164832 A1 | 8/2022 |

OTHER PUBLICATIONS

International Search Report and Written Opinion, PCT/US2022/013777, May 6, 2022, 11 pages.

Mendes, et al., "ICP-Based Pose-Graph SLAM," International Symposium on Safety, Security, and Rescue Robotics (SSRR), Oct. 2016, pp. 195-200, https://hal.archives-ouvertes.fr/hal-01522248/document.

Office Action Received in European Application No. 22705931.8-1201, Aug. 13, 2024, 3 pages.

* cited by examiner

SEMANTIC MODELS FOR ROBOT AUTONOMY ON DYNAMIC SITES

CROSS REFERENCE TO RELATED APPLICATIONS

This U.S. patent application is a continuation of, and claims priority under 35 U.S.C. § 119(e) to U.S. Provisional Application 63/143,528, filed on Jan. 29, 2021. The disclosure of this prior application is considered part of the disclosure of this application and is hereby incorporated by reference in its entirety.

TECHNICAL FIELD

This disclosure relates to semantic models for robotic autonomy on dynamic sites.

BACKGROUND

A robot is generally defined as a reprogrammable and multifunctional manipulator designed to move material, parts, tools, or specialized devices through variable programmed motions for a performance of tasks. Robots may be manipulators that are physically anchored (e.g., industrial robotic arms), mobile robots that move throughout an environment (e.g., legs, wheels, or traction based mechanisms), or some combination of a manipulator and a mobile robot. Robots are utilized in a variety of industries including, for example, manufacturing, transportation, hazardous environments, exploration, and healthcare. As such, the ability of robots to traverse environments with obstacles using coordinated movements provides additional benefits to such industries.

SUMMARY

An aspect of the present disclosure provides a computer-implemented method that, when executed by data processing hardware, causes the data processing hardware to perform operations. The operations include receiving, while a robot traverses a building environment, sensor data captured by one or more sensors of the robot. The operations include receiving a building information model (BIM) for the building environment. The BIM includes semantic information identifying one or more permanent objects within the building environment. The operations include generating a plurality of localization candidates for a localization map of the building environment. Each localization candidate of the plurality of localization candidates corresponds to a feature of the building environment identified by the sensor data and represents a potential localization reference point for the robot. The localization map is configured to localize the robot within the building environment when the robot moves throughout the building environment. For each localization candidate, the operations include determining whether the respective feature corresponding to the respective localization candidate is a permanent object in the building environment identified by the semantic information of the BIM and, when the respective feature corresponding to the respective localization candidate is a respective permanent object in the building environment identified by the semantic information of the BIM, generating the respective localization candidate as a localization reference point in the localization map for the robot.

The aspect of the present disclosure may provide one or more of the following optional features. In some implementations, the localization map autonomously guides the robot through the building environment. In some embodiments, the operations further include feeding the localization map of the building environment to a perception system of the robot. The perception system is configured to perform obstacle avoidance for the robot when the robot navigates the building environment performing a task within the building environment. In some examples, the BIM further includes schedule information. The schedule information indicates a time when a new permanent object will be installed in the building environment. In those examples, the operations further include instructing the robot to capture sensor data for the new permanent object after the time when the new permanent object is installed in the building environment and updating the localization map based on the sensor data captured for the new permanent object installed in the building environment. In some embodiments, the semantic information includes descriptors of objects within the building environment and the operations further include instructing the robot to capture sensor data based on one or more descriptors of objects within the building environment.

In some implementations, the BIM further includes a no-step region for the robot. The no-step region indicates an area where the robot should avoid stepping. In those implementations, the operations further include generating a no-step region in the localization map to represent the no-step region for the robot from the BIM. In further implementations, the operations further include communicating the no-step region to a step planning controller. The step planning controller is configured to coordinate footstep placement for the robot when the robot executes a task within the building environment. In some embodiments, the operations further include receiving, from an operator of the robot, an authored task for the robot to perform within the building environment and autonomously navigating through the building environment to perform the authored task using the localization map.

In some examples, the operations further include removing non-permanent objects from the localization map by determining a location for a perceived object identified from the sensor data captured by the robot, identifying a respective location in the BIM that corresponds to the location of the perceived object identified from the sensor data captured by the robot, and determining that the BIM fails to indicate a permanent object at the respective location. In some implementations, the robot includes four legs. In some embodiments, the BIM includes a three-dimensional representation of the building environment.

Another aspect of the present disclosure provides a robot. The robot includes a body, one or more locomotion-based structures coupled to the body, a sensor system at least partially disposed on the body, data processing hardware in communication with the sensor system, and memory hardware in communication with the data processing hardware. The memory hardware stores instructions that, when executed on the data processing hardware, cause the data processing hardware to perform operations. The operations include receiving, while the robot traverses a building environment, sensor data captured by the sensor system of the robot. The operations include receiving a building information model (BIM) for the building environment. The BIM includes semantic information identifying one or more permanent objects within the building environment. The operations include generating a plurality of localization candidates for a localization map of the building environment. Each localization candidate of the plurality of localization candidates corresponds to a feature of the building environment identified by the sensor data and represents a potential localization reference point for the robot. The localization map is configured to localize the robot within the building environment when the robot moves throughout the building environment. For each localization candidate, the operations include determining whether the respective feature corresponding to the respective localization candidate is a permanent object in the building environment identified by the semantic information of the BIM and, when the respective feature corresponding to the respective localization candidate is a respective permanent object in the building environment identified by the semantic information of the BIM, generating the respective localization candidate as a localization reference point in the localization map for the robot.

This aspect of the present disclosure may include one or more of the following optional features. In some implementations, the localization map autonomously guides the robot through the building environment. In some embodiments, the operations further include feeding the localization map of the building environment to a perception system of the robot. The perception system is configured to perform obstacle avoidance for the robot when the robot navigates the building environment performing a task within the building environment. In some examples, the BIM further includes schedule information. The schedule information indicates a time when a new permanent object will be installed in the building environment. In those examples, the operations further include instructing the robot to capture sensor data for the new permanent object after the time when the new permanent object is installed in the building environment and updating the localization map based on the sensor data captured for the new permanent object installed in the building environment. In some embodiments, the semantic information includes descriptors of objects within the building environment and the operations further include instructing the robot to capture sensor data based on one or more descriptors of objects within the building environment.

In some implementations, the BIM further includes a no-step region for the robot. The no-step region indicates an area where the robot should avoid stepping. In those implementations, the operations further include generating a no-step region in the localization map to represent the no-step region for the robot from the BIM. In further implementations, the operations further include communicating the no-step region to a step planning controller. The step planning controller is configured to coordinate footstep placement for the robot when the robot executes a task within the building environment. In some embodiments, the operations further include receiving, from an operator of the robot, an authored task for the robot to perform within the building environment and autonomously navigating through the building environment to perform the authored task using the localization map.

In some examples, the operations further include removing non-permanent objects from the localization map by determining a location for a perceived object identified from the sensor data captured by the robot, identifying a respective location in the BIM that corresponds to the location of the perceived object identified from the sensor data captured by the robot, and determining that the BIM fails to indicate a permanent object at the respective location. In some implementations, the one or more locomotion-based structures include four legs. In some embodiments, the BIM includes a three-dimensional representation of the building environment.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
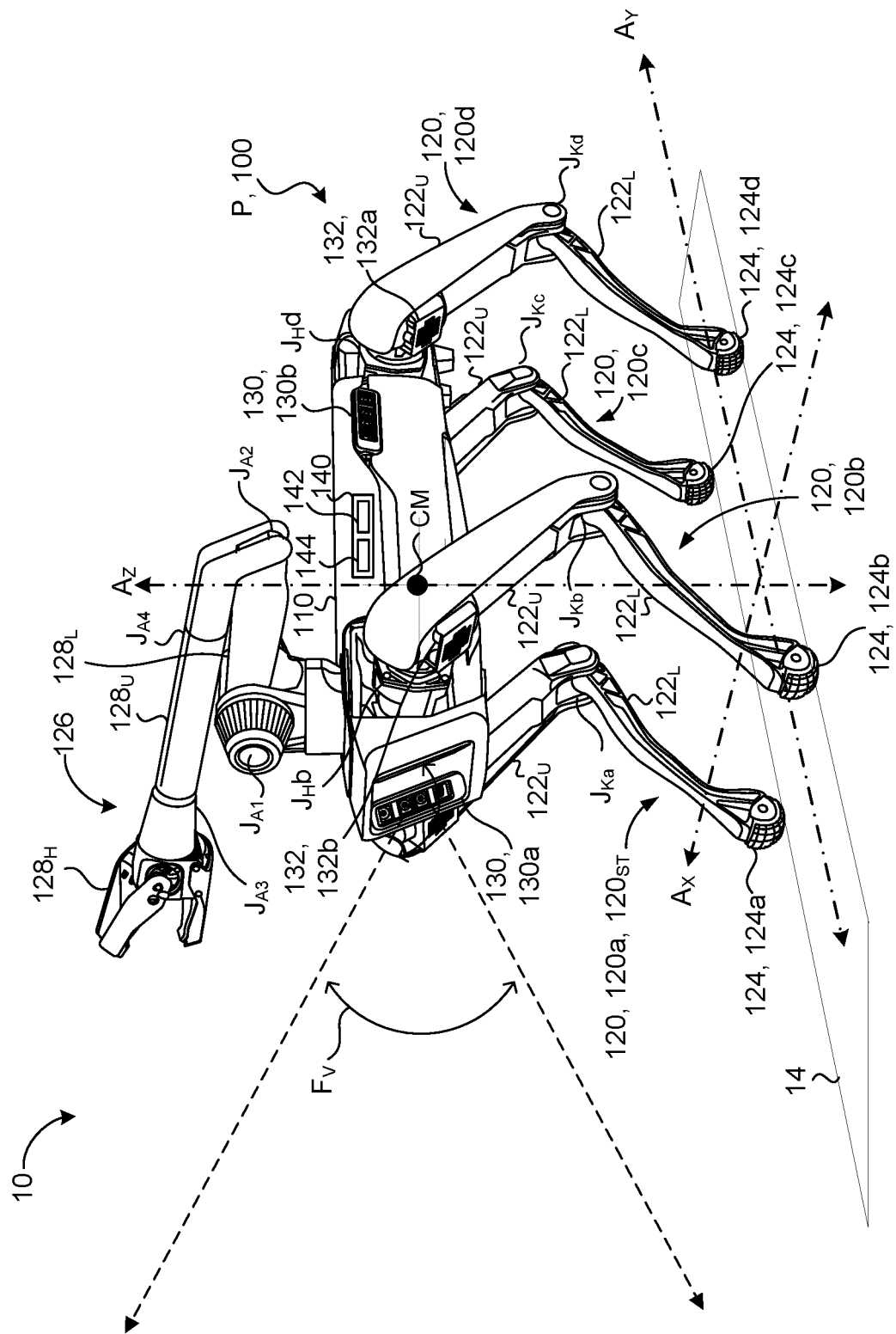
FIG. 1A is a perspective view of an example robot capable of object-based robot control.

Robots are often deployed in environments or sites that are dynamically changing. A dynamically changing site is an environment whose structure or objects within the site have some temporary or nonpermanent nature. One common example of a dynamically changing environment is a construction site. A construction site is a changing environment in that the construction site often includes temporary or non-permanent objects, such as tools, tool storage, machinery, material, etc. Furthermore, during construction, the structure of the construction site may change. For instance, a construction project may call for demolition where a previously existing wall is demolished or construction where a new wall that did not previously exist is constructed. These dynamic changes or changes over time may pose an issue for a robot deployed to perform some task within the dynamically changing site.

In order for a robot to perform some designated task, the robot may need to rely on accurate and/or reliable localization and navigation. This may be especially true when the robot operates autonomously or semi-autonomously. For localization and navigation purposes, the robot may initially be taught the environment in a mapping process. For example, during the mapping process, the operator of the robot may initially drive the robot through the environment collecting sensor data from sensors associated with the robot. The sensor data (e.g., image data or point cloud data) gathered during this initial mapping process allows the robot to construct a site map of the environment referred to as a localization map. The robot generates the localization map by defining features present within the environment using the sensor data. In other words, based on the sensor data, the robot identifies localization features in the environment that the robot may later use as localization reference points to determine where the robot is located within the environment. This type of mapping process enables the robot to subsequently navigate the environment to perform a particular task. For instance, the site may include a structural pillar that the robot uses as a localization feature. Here, when the robot moves through the environment and gathers sensor data that corresponds to the structural pillar, the geometry and orientation of the structural pillar relative to the robot as captured by the sensor data informs the robot that it is at some definitive location in the space. For instance, the sensor data corresponding to the structural pillar informs the robot that it is some distance from a door or other features present on the site.

To ensure reliable localization and navigation, the robot may perform localization on features within the environment that are permanent and unlikely to change. In some circumstances, if the robot were to perform localization on features within the environment that are nonpermanent or have some chance of dynamically changing, the robot's localization map may become inaccurate when such a feature changes. As one example in connection with a certain construction site, if the robot were to generate a localization reference point that corresponds to a fork lift and the fork lift moves to another area on the construction site, the robot may lose some ability to know where it is on the map because a potentially critical feature for localization has been removed. Therefore, when the robot anchors its localization on geometric or visual features of nonpermanent objects, the robot may incur a risk that its localization may be compromised when the state of the nonpermanent object changes.

While human intelligence is naturally able to identify object permanence as a result of experience, a robot may not have the same ability. Rather, it may be that a human being, such as an operator of the robot, would have to train or to teach the robot whether an object is permanent or not permanent in order to prevent the robot from localizing with a nonpermanent object. To train the robot in this manner could be a slow and arduous process especially when a dynamic environment may be large and/or include a multitude of objects. Simply put, this manual training approach may be resource intensive. Furthermore, since nonpermanent objects may enter or exit the changing environment and permanent objects may be introduced to the changing environment in the future, a manual approach would likely require the operator to update the robot that some change has occurred in the dynamic environment. For example, if a wall is constructed or the heating, ventilation, and air conditioning (HVAC) system is installed, even previously permanent features may no longer exhibit the same geometric or visual characteristics. In this example, if such a change occurred, the robot would likely need to either modify its localization with respect to the changes or to generate an entirely new localization map by driving through the site (or some portion of the site) again. Moreover, when the robot accommodates for these changes, the robot may also need to update behaviors or tasks that it has been programmed to perform in the environment. In one example scenario, the robot may have previously used a corner of a room as a localization feature. Here, the robot may have used this localization feature for navigation when the robot moved through the changing environment on its path to perform the particular task. If HVAC ducts were installed to obscure the corner of the room, suddenly the robot may become lost (i.e., unable to find its location in the environment) as it travels to perform the particular task. In this sense, a dynamic change to an object within the changing environment may result in actions of the robot being invalid. Therefore, the robot has to be taught of any significant changes to a dynamic environment which may affect the behavior of the robot.

To address some of the issues that dynamically changing environments pose, the robot may leverage a semantic model. A semantic model is a virtual model of a site that contains semantic information regarding geometry and/or data needed to support construction, fabrication, and/or other procurement activities that occur at the site. Generally speaking, a semantic model is created as a shared knowledge resource such that entities involved in the processes that will occur on the site (e.g., the construction, fabrication, and/or other procurement activities) may collaborate together and have the precise knowledge of where activities will occur and what will be the result of these activities. A semantic model is typically a three-dimensional (3D) model that includes topographical, spatial, geometric, and other relationship information for objects contained within the model. For instance, the semantic model includes information that labels objects of the site with what they are and/or other characteristics such as material composition. Moreover, the semantic model may also include scheduling information to help entities coordinate processes involving the site. In this respect, the semantic model defines permanent objects of the site with precision and defines when and where these permanent objects will be present on the site. With both scheduling information and precise information about the objects on the site, the robot may use this information from the semantic model (i.e., semantic information) to avoid localization and navigation issues while operating on the site. When the site is a building, the semantic model may be referred to as a building information model (BIM) that includes building information as the semantic information. Returning to the HVAC example in a building environment, the scheduling information of a BIM could define that HVAC ducts will be installed to obscure the corner of the room at some specific time in the future. The robot may use this information to modify the localization map to ensure that the corner of the room is either removed or never established as a localization reference point. By using building information from a BIM or semantic model, the robot may incorporate this information into the localization and/or navigation process without taxing the operator (e.g., without requiring the operator to update the localization systems of the robot when changes occur on the site).

Figure 1B:
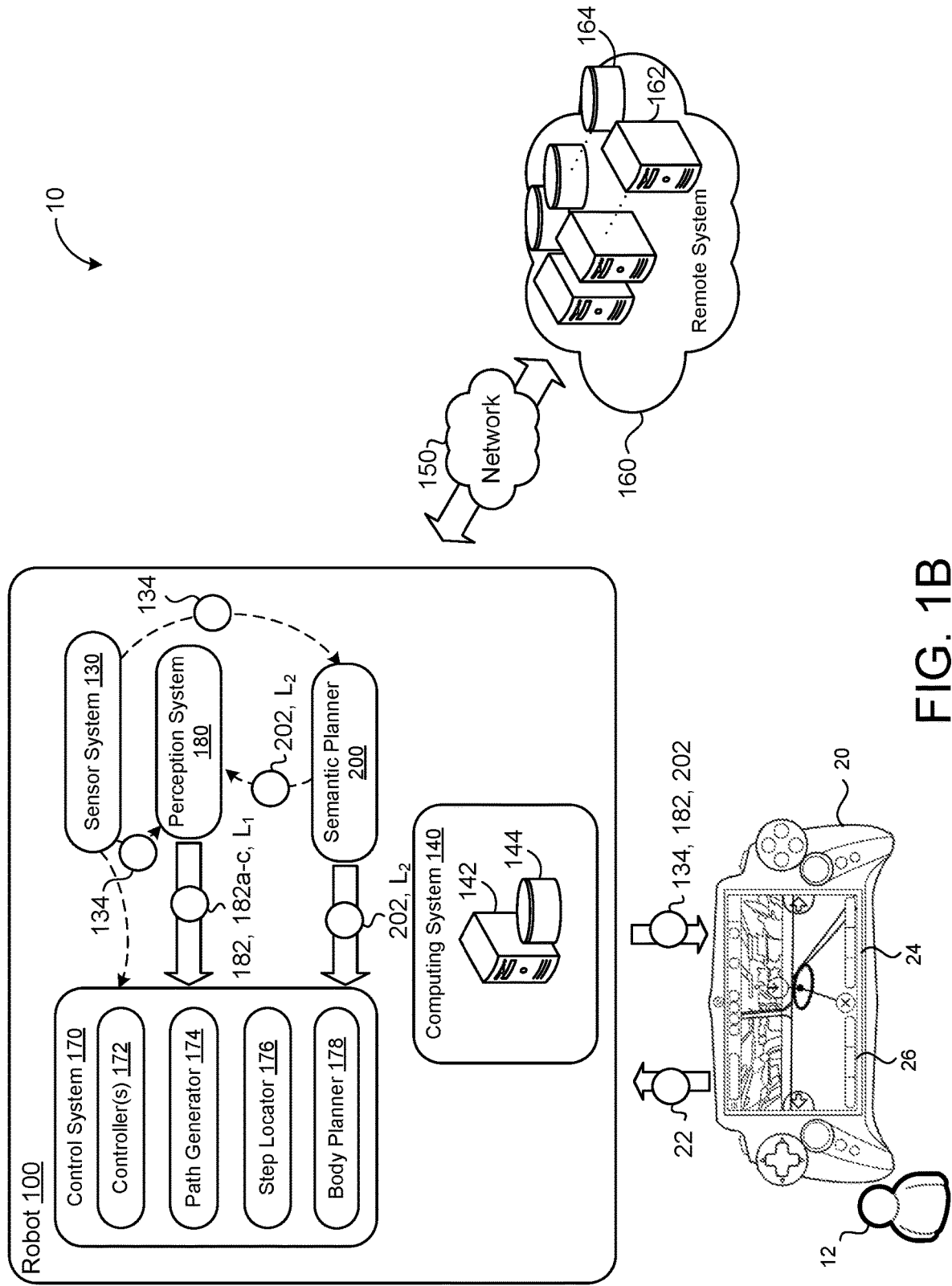
FIG. 1B is a schematic view of example systems of the robot of FIG. 1A.

Referring to FIGS. 1A and 1B, the robot 100 includes a body 110 with one or more locomotion-based structures such as legs 120*a-d* coupled to the body 110 that enable the robot 100 to move about the dynamically changing environment 10 (hereinafter referred to as the environment 10). In some examples, each leg 120 is an articulable structure such that one or more joints J permit members 122 of the leg 120 to move. For instance, each leg 120 includes a hip joint $J_H$ coupling an upper member 122, 122$_U$ of the leg 120 to the body 110 and a knee joint $J_K$ coupling the upper member 122$_U$ of the leg 120 to a lower member 122$_L$ of the leg 120. Although FIG. 1A depicts a quadruped robot with four legs 120*a-d*, the robot 100 may include any number of legs or locomotive based structures (e.g., a biped or humanoid robot with two legs, or other arrangements of one or more legs) that provide a means to traverse the terrain within the environment 10.

In order to traverse the terrain, each leg 120 has a distal end 124 that contacts a surface of the terrain (i.e., a traction surface). In other words, the distal end 124 of the leg 120 is the end of the leg 120 used by the robot 100 to pivot, plant, or generally provide traction during movement of the robot 100. For example, the distal end 124 of a leg 120 correspond to a foot of the robot 100. In some examples, though not shown, the distal end 124 of the leg 120 includes an ankle joint JA such that the distal end 124 is articulable with respect to the lower member 122$_L$ of the leg 120.

In the examples shown, the robot 100 includes an arm 126 that functions as a robotic manipulator. The arm 126 may be configured to move about multiple degrees of freedom in order to engage elements of the environment 10 (e.g., interactable objects within the environment 10). In some examples, the arm 126 includes one or more members 128, where the members 128 are coupled by joints J such that the arm 126 may pivot or rotate about the joint(s) J. For instance, with more than one member 128, the arm 126 may be configured to extend or to retract. To illustrate an example, FIG. 1A depicts the arm 126 with three members 128 corresponding to a lower member $128_L$, an upper member $128_U$, and a hand member $128_H$ (e.g., also referred to as an end-effector $128_H$). Here, the lower member $128_L$ may rotate or pivot about a first arm joint $J_{A1}$ located adjacent to the body 110 (e.g., where the arm 126 connects to the body 110 of the robot 100). The lower member $128_L$ is coupled to the upper member $128_U$ at a second arm joint $J_{A2}$ and the upper member $128_U$ is coupled to the hand member $128_H$ at a third arm joint $J_{A3}$. In some examples, such as FIG. 1A, the hand member $128_H$ or end-effector $128_H$ is a mechanical gripper that includes a one or more moveable jaws configured to perform different types of grasping of elements within the environment 10. In the example shown, the end-effector $128_H$ includes a fixed first jaw and a moveable second jaw that grasps objects by clamping the object between the jaws. The moveable jaw is configured to move relative to the fixed jaw in order to move between an open position for the gripper and a closed position for the gripper (e.g., closed around an object). In some implementations, the arm 126 additionally includes a fourth joint $J_{A4}$. The fourth joint $J_{A4}$ may be located near the coupling of the lower member $128_L$ to the upper member $128_U$ and function to allow the upper member $128_U$ to twist or rotate relative to the lower member $128_L$. In other words, the fourth joint $J_{A4}$ may function as a twist joint similarly to the third joint $J_{A3}$ or wrist joint of the arm 126 adjacent the hand member $128_H$. For instance, as a twist joint, one member coupled at the joint J may move or rotate relative to another member coupled at the joint J (e.g., a first member coupled at the twist joint is fixed while the second member coupled at the twist joint rotates). In some implementations, the arm 126 connects to the robot 100 at a socket on the body 110 of the robot 100. In some configurations, the socket is configured as a connector such that the arm 126 may attach or detach from the robot 100 depending on whether the arm 126 is needed for operation.

The robot 100 has a vertical gravitational axis (e.g., shown as a Z-direction axis $A_Z$) along a direction of gravity, and a center of mass CM, which is a position that corresponds to an average position of all parts of the robot 100 where the parts are weighted according to their masses (i.e., a point where the weighted relative position of the distributed mass of the robot 100 sums to zero). The robot 100 further has a pose P based on the CM relative to the vertical gravitational axis $A_Z$ (i.e., the fixed reference frame with respect to gravity) to define a particular attitude or stance assumed by the robot 100. The attitude of the robot 100 can be defined by an orientation or an angular position of the robot 100 in space. Movement by the legs 120 relative to the body 110 alters the pose P of the robot 100 (i.e., the combination of the position of the CM of the robot and the attitude or orientation of the robot 100). Here, a height generally refers to a distance along the z-direction (e.g., along a z-direction axis $A_Z$). The sagittal plane of the robot 100 corresponds to the Y-Z plane extending in directions of a y-direction axis $A_Y$ and the z-direction axis $A_Z$. In other words, the sagittal plane bisects the robot 100 into a left and a right side. Generally perpendicular to the sagittal plane, a ground plane (also referred to as a transverse plane) spans the X-Y plane by extending in directions of the x-direction axis $A_X$ and the y-direction axis $A_Y$. The ground plane refers to a ground surface 14 where distal ends 124 of the legs 120 of the robot 100 may generate traction to help the robot 100 move about the environment 10. Another anatomical plane of the robot 100 is the frontal plane that extends across the body 110 of the robot 100 (e.g., from a left side of the robot 100 with a first leg 120a to a right side of the robot 100 with a second leg 120b). The frontal plane spans the X-Z plane by extending in directions of the x-direction axis $A_X$ and the z-direction axis $A_Z$.

In order to maneuver about the environment 10 or to perform tasks using the arm 126, the robot 100 includes a sensor system 130 (also referred to as a vision system) with one or more sensors 132, 132a-n. For instance, FIG. 1A illustrates a first sensor 132, 132a mounted at a head of the robot 100 (i.e., near a front portion of the robot 100 adjacent the front legs 120a-b), a second sensor 132, 132b mounted near the hip of the second leg 120b of the robot 100, a third sensor 132, 132c corresponding one of the sensors 132 mounted on a side of the body 110 of the robot 100, a fourth sensor 132, 132d mounted near the hip of the fourth leg 120d of the robot 100, and a fifth sensor 132, 132e mounted at or near the end-effector $128_H$ of the arm 126 of the robot 100. The sensors 132 may include vision/image sensors, inertial sensors (e.g., an inertial measurement unit (IMU)), force sensors, and/or kinematic sensors. Some examples of sensors 132 include a camera such as a stereo camera, a time-of-flight (TOF) sensor, a scanning light-detection and ranging (LIDAR) sensor, or a scanning laser-detection and ranging (LADAR) sensor. In some examples, the sensor 132 has a corresponding field(s) of view $F_V$ defining a sensing range or region corresponding to the sensor 132. For instance, FIG. 1A depicts a field of a view $F_V$ for the robot 100. Each sensor 132 may be pivotable and/or rotatable such that the sensor 132 may, for example, change the field of view $F_V$ about one or more axis (e.g., an x-axis, a y-axis, or a z-axis in relation to a ground plane). In some examples, multiple sensors 132 may be clustered together (e.g., similar to the first sensor 132a) to stitch a larger field of view $F_V$ than any single sensor 132. With sensors 132 placed about the robot 100, the sensor system 130 may have a 360 degree view or a nearly 360 degree view of the surroundings of the robot 100.

When surveying a field of view $F_V$ with a sensor 132, the sensor system 130 generates sensor data 134 (e.g., image data) corresponding to the field of view $F_V$. The sensor system 130 may generate the field of view $F_V$ with a sensor 132 mounted on or near the body 110 of the robot 100 (e.g., sensor(s) 132a, 132b). The sensor system 130 may additionally and/or alternatively generate the field of view $F_V$ with a sensor 132 mounted at or near the end-effector $128_H$ of the arm 126 (e.g., sensor(s) 132c). The one or more sensors 132 may capture sensor data 134 that defines the three-dimensional point cloud for the area within the environment 10 about the robot 100. In some examples, the sensor data 134 is image data that corresponds to a three-dimensional volumetric point cloud generated by a three-dimensional volumetric image sensor 132. Additionally or alternatively, when the robot 100 is maneuvering about the environment 10, the sensor system 130 gathers pose data for the robot 100 that includes inertial measurement data (e.g., measured by an IMU). In some examples, the pose data includes kinematic data and/or orientation data about the robot 100, for instance, kinematic data and/or orientation data about joints J or other portions of a leg 120 or arm 126 of the robot 100. With the sensor data 134, various systems of the robot 100 may use the sensor data 134 to define a current state of the robot 100 (e.g., of the kinematics of the robot 100) and/or a current state of the environment 10 about the robot 100. In other words, the sensor system 130 may communicate the sensor data 134 from one or more sensors 132 to any other system of the robot 100 in order to assist the functionality of that system.

In some implementations, the sensor system 130 includes sensor(s) 132 coupled to a joint J. Moreover, these sensors 132 may couple to a motor M that operates a joint J of the robot 100 (e.g., sensors 132, 132$b$-$d$). Here, these sensors 132 generate joint dynamics in the form of joint-based sensor data 134. Joint dynamics collected as joint-based sensor data 134 may include joint angles (e.g., an upper member 122$_U$ relative to a lower member 122$_L$ or hand member 126H relative to another member of the arm 126 or robot 100), joint speed (e.g., joint angular velocity or joint angular acceleration), and/or forces experienced at a joint J (also referred to as joint forces). Joint-based sensor data generated by one or more sensors 132 may be raw sensor data, data that is further processed to form different types of joint dynamics, or some combination of both. For instance, a sensor 132 measures joint position (or a position of member(s) 122 coupled at a joint J) and systems of the robot 100 perform further processing to derive velocity and/or acceleration from the positional data. In other examples, a sensor 132 is configured to measure velocity and/or acceleration directly.

As the sensor system 130 gathers sensor data 134, a computing system 140 stores, processes, and/or to communicates the sensor data 134 to various systems of the robot 100 (e.g., the control system 170, the perception system 180, the semantic planner 200, and/or remote controller 20). In order to perform computing tasks related to the sensor data 134, the computing system 140 of the robot 100 includes data processing hardware 142 and memory hardware 144. The data processing hardware 142 is configured to execute instructions stored in the memory hardware 144 to perform computing tasks related to activities (e.g., movement and/or movement based activities) for the robot 100. Generally speaking, the computing system 140 refers to one or more locations of data processing hardware 142 and/or memory hardware 144.

In some examples, the computing system 140 is a local system located on the robot 100. When located on the robot 100, the computing system 140 may be centralized (e.g., in a single location/area on the robot 100, for example, the body 110 of the robot 100), decentralized (e.g., located at various locations about the robot 100), or a hybrid combination of both (e.g., including a majority of centralized hardware and a minority of decentralized hardware). To illustrate some differences, a decentralized computing system 140 may allow processing to occur at an activity location (e.g., at motor that moves a joint of a leg 120) while a centralized computing system 140 may allow for a central processing hub that communicates to systems located at various positions on the robot 100 (e.g., communicate to the motor that moves the joint of the leg 120).

Additionally or alternatively, the computing system 140 includes computing resources that are located remotely from the robot 100. For instance, the computing system 140 communicates via a network 150 with a remote system 160 (e.g., a remote server or a cloud-based environment). Much like the computing system 140, the remote system 160 includes remote computing resources, such as remote data processing hardware 162 and remote memory hardware 164. Here, sensor data 134 or other processed data (e.g., data processing locally by the computing system 140) may be stored in the remote system 160 and may be accessible to the computing system 140. In additional examples, the computing system 140 is configured to utilize the remote resources 162, 164 as extensions of the computing resources 142, 144 such that resources of the computing system 140 may reside on resources of the remote system 160.

In some implementations, as shown in FIGS. 1A and 1B, the robot 100 includes a control system 170 and a perception system 180. The perception system 180 is configured to receive the sensor data 134 from the sensor system 130 and process the sensor data 134 to generate maps 182. With the maps 182 generated by the perception system 180, the perception system 180 may communicate the maps 182 to the control system 170 in order to perform controlled actions for the robot 100, such as moving the robot 100 about the environment 10 (e.g., to perform a particular task). In some examples, by having the perception system 180 separate from, yet in communication with the control system 170, processing for the control system 170 focuses on controlling the robot 100 while the processing for the perception system 180 focuses on interpreting the sensor data 134 gathered by the sensor system 130. For instance, these systems 170, 180 execute their processing in parallel to ensure accurate, fluid movement of the robot 100 in an environment 10.

A given controller 172 may control the robot 100 by controlling movement about one or more joints J of the robot 100. In some configurations, the given controller 172 is software with programming logic that controls at least one joint J or a motor M which operates, or is coupled to, a joint J. For instance, the controller 172 controls an amount of force that is applied to a joint J (e.g., torque at a joint J). As programmable controllers 172, the number of joints J that a controller 172 controls is scalable and/or customizable for a particular control purpose. A controller 172 may control a single joint J (e.g., control a torque at a single joint J), multiple joints J, or actuation of one or more members 128 (e.g., actuation of the hand member 128$_U$) of the robot 100. By controlling one or more joints J, actuators or motors M, the controller 172 may coordinate movement for all different parts of the robot 100 (e.g., the body 110, one or more legs 120, the arm 126). For example, to perform a behavior with some movements, a controller 172 may be configured to control movement of multiple parts of the robot 100 such as, for example, two legs 120$a$-$b$, four legs 120$a$-$d$, or two legs 120$a$-$b$ combined with the arm 126.

The control system 170 may be configured to communicate with at least one sensor system 130 and/or any other system of the robot 100 (e.g., the perception system 180 and/or the semantic planner 200). The control system 170 performs operations and other functions using the computing system 140. The controller 172 is configured to control movement of the robot 100 to traverse the environment 10 based on input and/or feedback from the systems of the robot 100 (e.g., the perception system 180 and/or the semantic planner 200). This may include movement between poses and/or behaviors of the robot 100. For example, the controller 172 controls different footstep patterns, leg patterns, body movement patterns, and/or vision system-sensing patterns.

In some implementations, the control system 170 includes specialty controllers 172 that are dedicated to a particular control purpose. These specialty controllers 172 may include the path generator 174, the step locator 176, and/or the body planner 178. Referring to FIG. 1B, the path generator 174 is configured to determine horizontal motion for the robot 100. For instance, the horizontal motion refers to translation (i.e., movement in the X-Y plane) and/or yaw (i.e., rotation about the Z-direction axis $A_Z$) of the robot 100. The path generator 174 determines obstacles within the environment 10 about the robot 100 based on the sensor data 134. The path generator 174 communicates the obstacles to the step locator 176 such that the step locator 176 may identify foot placements for legs 120 of the robot 100 (e.g., locations to place the distal ends 124 of the legs 120 of the robot 100). The step locator 176 generates the foot placements (i.e., locations where the robot 100 should step) using inputs from the perceptions system 180 (e.g., map(s) 182). The body planner 178, much like the step locator 176, receives inputs from the perception system 180 (e.g., map(s) 182). Generally speaking, the body planner 178 is configured to adjust dynamics of the body 110 of the robot 100 (e.g., rotation, such as pitch or yaw and/or height of COM) to successfully move about the environment 10.

In some examples, the control system 170 is in communication with a remote controller 20 that an operator 12 of the robot 100 uses to control the robot 100. The remote controller 20 provides a user interface 26 that enables an operator 12 of the robot 100 to issue commands 22 to the robot 100 (e.g., the control system 170 of the robot 100) while being at some distance from the robot 100 (i.e., remote from the robot 100). These commands 22 may be used to operate the robot 100 (e.g., instruct the control system 170 to perform various degrees of control of the robot 100) and/or to request sensor data 134 from the sensor system 130 about the robot 100 (e.g., a current state of the robot 100). To provide the user interface 26, the remote controller 20 may receive various information from systems of the robot 100 (e.g., the sensor system 130, the control system 170, the perception system 180, and/or the semantic planner 200). In some examples, the remote controller 20 includes a means to provide directional control to the robot (e.g., with a joystick, directional pad, or touchscreen controls) and a display 24 that provides visual feedback to the operator 12 at the user interface 26. The display 24 may include a viewport window that depicts the sensor data 134 or some modified form of the sensor data 134 as a visual feed (e.g., a camera feed). In some implementations, the display 24 depicts the one or more maps 182, 202 generated by the perception system 180 and/or semantic planner such that the operator 12 may understand the environment 10 where the robot 100 is located and allow the operator 12 to provide commands 22 based on information found in the maps 182, 202. The display 24 may also function as a graphical user interface that enables the operator 12 to generate commands 22 for the robot 100. To aid in the generation of such commands 22, the remote controller 20 may include buttons or other touch functionality to receive selection inputs or other forms of input or feedback from the operator 12.

The perception system 180 is a system of the robot 100 that helps the robot 100 to move more precisely in a terrain with various obstacles. As the sensors 132 collect sensor data 134 for the space about the robot 100 (i.e., the robot's environment 10), the perception system 180 uses the sensor data 134 to form one or more maps 182 for the environment 10. Once the perception system 180 generates a map 182, the perception system 180 is also configured to add information to the map 182 (e.g., by projecting sensor data 134 on a preexisting map) and/or to remove information from the map 182.

In some examples, the one or more maps 182 generated by the perception system 180 may be considered action level maps $L_1$ (e.g., in contrast to a localization level map). A map 182 that operates at the action level $L_1$ refers to one or more maps 182 that guide movement of the robot 100 based on movement actions that the robot 100 is currently performing with respect to the immediate surroundings that are in the robot's field of view $F_V$. These action level maps 182 are therefore configured to inform the robot 100 how to step or to move the body 110 of the robot 100 based on the current sensor data 134.

Some examples of action level maps 182, $L_2$ are a ground height map 182, 182a, a no step map 182, 182b, and a body obstacle map 182, 182c. The ground height map 182a may refer to a map 182 generated by the perception system 180 based on voxels from a voxel map. In some implementations, the ground height map 182a functions such that, at each X-Y location within a grid of the map 182 (e.g., designated as a cell of the ground height map 182a), the ground height map 182a specifies a height. In other words, the ground height map 182a conveys that, at a particular X-Y location in a horizontal plane, the robot 100 should step at a certain height. The no step map 182b may refer to a map 182 that defines regions where the robot 100 is not allowed to step in order to advise the robot 100 when the robot 100 may step at a particular horizontal location (i.e., location in the X-Y plane). When the perception system 180 generates the no-step map 182b, the perception system 180 may generate a Boolean value map where the Boolean value map identifies no step regions and step regions. A no step region refers to a region of one or more cells where an obstacle exists while a step region refers to a region of one or more cells where an obstacle is not perceived to exist. The body obstacle map 182c generally determines whether the body 110 of the robot 100 may overlap a location in the X-Y plane with respect to the robot 100. In other words, the body obstacle map 182c identifies obstacles for the robot 100 to indicate whether the robot 100, by overlapping at a location in the environment 10, risks collision or potential damage with obstacles near or at the same location.

The semantic planner 200 is a system of the robot 100 that may be configured to generate (or to modify) a localization map 202 for the robot 100. As stated previously, the localization map 202 refers to a map that enables the robot 100 to determine its location in the environment 10 based on features of the environment 10. The localization map 202 may be initially constructed by driving or moving the robot 100 through the environment 10 where the robot 100 will be operating and gathering sensor data 134 while the robot 100 is being driven through the environment 10. That is, an operator 12 of the robot 100 may teach the robot 100 the parameters of the environment 10 and how to navigate the environment 10 (e.g., autonomously or semi-autonomously) by initially driving the robot 100 through the environment 10. During this mapping process, the localization map 202 is formed by determining features (e.g., geometric shapes) of objects in the environment 10 from the gathered sensor data 134 to use as localization reference points 222. With the localization reference points 222, the semantic planner 200 generates (or modifies) the localization map 202 to provide the robot 100 with the means to determine its relative location in the environment 10 during subsequent activity in the environment 10. Stated differently, the localization map 202 functions as a map for a particular environment site (i.e., a site map) constructed from sensor data 134 with prioritized features that enable the robot 100 to understand spatially where it is on the site. Instead of operating on the action level $L_1$ of the maps 182 generated by the perception system 180, the localization map 202 operates on a localization level $L_2$ to indicate where the robot 100 is located with respect to features in the environment 10 and to guide the robot 100 during navigation based on the relationship of these features. Therefore, when the robot 100 is subsequently moving about in the environment 10, the localization map 202 allows the robot 100 to recognize one or more features in order to contextualize its position (e.g., relative to other features in the environment 10).

To generate the localization map 202, the semantic planner 200 is configured to confirm that a feature used as a respective localization reference point 222 corresponds to a permanent feature rather than a temporary or nonpermanent feature. In some examples, a nonpermanent feature refers to an object that undergoes some type of change in state within a period of two weeks or less. Yet in some implementations, the semantic planner 200 configures the degree of desired nonpermanence for a feature. For instance, the semantic planner 200 changes the threshold for permanence from two weeks to one week or to three weeks. In some configurations, the semantic planner 200 is part of the generation for the localization map 202 such that, during the generation of each localization reference point 222, the semantic planner 200 determines whether the localization reference point 222 corresponds to a permanent object PO or feature. Additionally or alternatively, a localization map 202 with localization reference points may be fed to the semantic planner 200 and the semantic planner 200 checks to see if one or more localization reference points should be modified or removed from the received localization map 202 because the one or more reference points correspond to a nonpermanent object NPO in the environment 10.

Figure 2A:
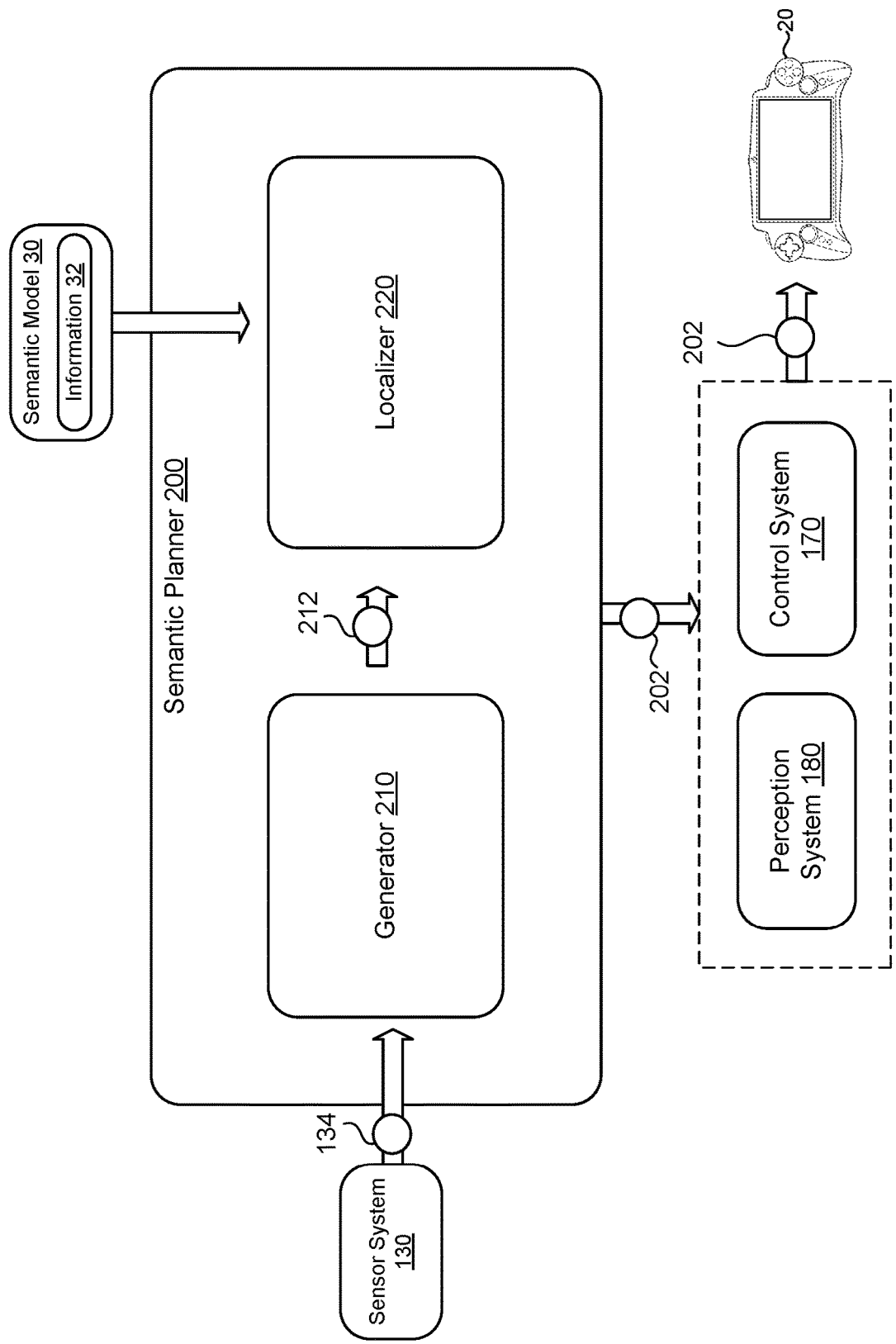
FIGS. 2A-2D are schematic views of example semantic planners for the robot of FIG. 1B
Figure 2B:
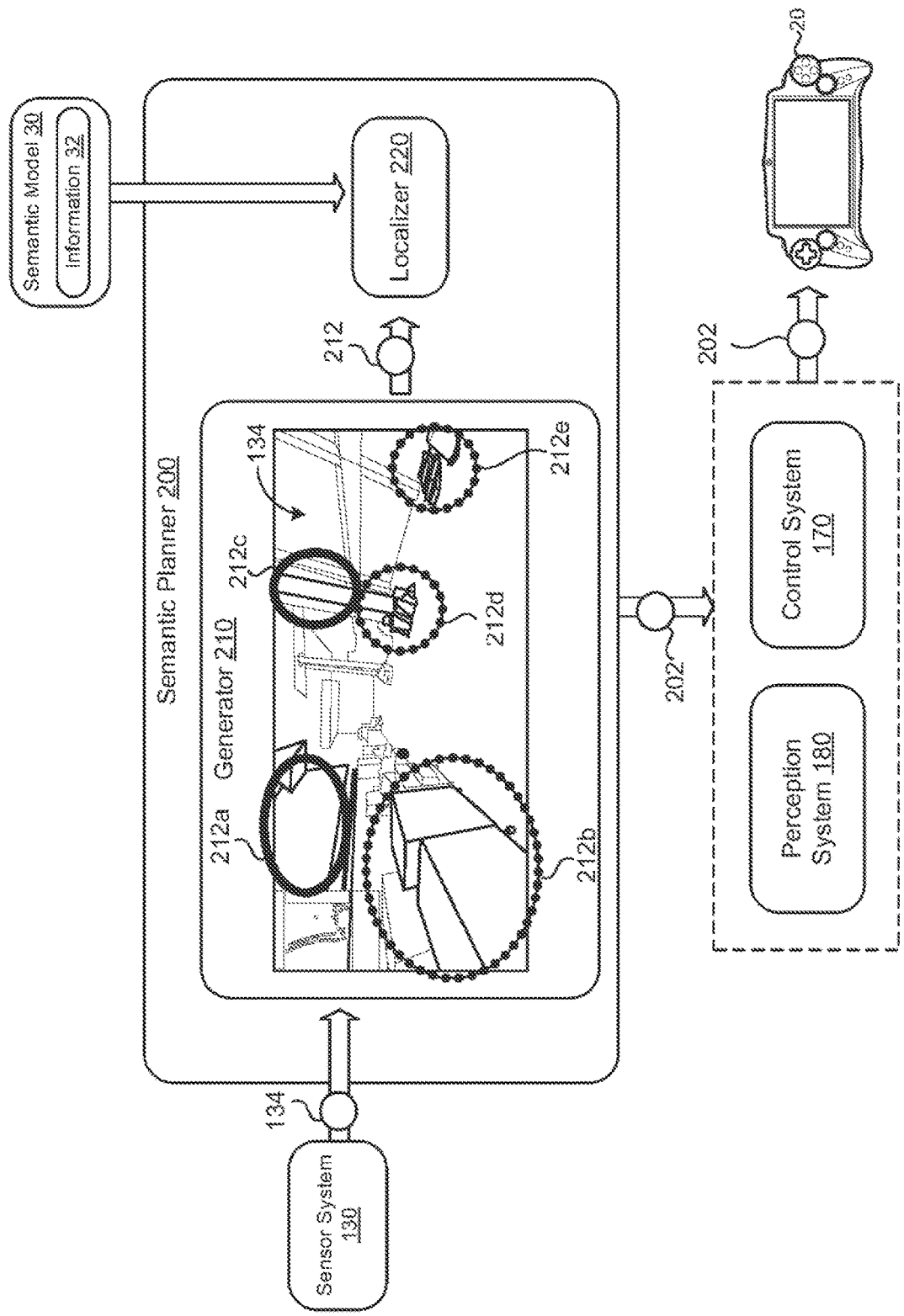

Referring to FIGS. 2A-2D, the semantic planner 200 includes a generator 210 and a localizer 220. The generator 210 is configured to receive sensor data 134 captured by one or more sensors 132 of the robot 100. From the sensor data 134, the generator 210 generates a plurality of localization candidates 212, 212a-n for a localization map 202 of the environment 10. Here, each localization candidate 212 corresponds to a feature or object of the environment 10 identified by the sensor data 134 and represents a potential localization reference point for the robot 100. For example, FIG. 2B depicts a view of a building environment 10 where the robot 100 is gathering sensor data 134. In this example, the generator 210 identifies five localization candidates 212, 212a-e. A first localization candidate 212, 212a corresponds to an area of a wall. A second localization candidate 212, 212b corresponds to toolboxes. A third localization candidate 212, 212c corresponds to a vertical pipe adjacent a vertical support pillar. A fourth localization candidate 212, 212d corresponds to rolls of material at a base of the vertical support pillar. A fifth localization candidate 212, 212e corresponds to a stack of cardboard boxes.

Once the generator 210 generates the plurality of localization candidates 212, the generator 210 passes the localization candidates 212 to the localizer 220. The localizer 220 is configured to determine whether the underlying feature or object corresponding to a localization candidate 212 is a permanent object PO or a nonpermanent object NPO in the environment 10. When the object corresponding to a localization candidate 212 is a permanent object PO, the localizer 220 permits or converts the localization candidate 212 to be a localization reference point 222 in the localization map 202. When the object corresponding to a localization candidate 212 is a nonpermanent object NPO, the localizer 220 prevents the localization candidate 212 from being used as a localization reference point 222 in the localization map 202.

To determine the type of object that the localization candidate 212 is, the localizer 220 receives a semantic model 30 (e.g., a BIM) that includes semantic information 32. The semantic information 32 (or building information) includes information that identifies material properties or other descriptors for objects within the semantic model 30. For instance, the semantic information includes annotations with labels that indicate what the object is and/or what is its purpose. The information or descriptors of the semantic information 32 may identify or describe an object by a category or class or type of object (e.g., a light fixture), by a subcategory or subclass or subtype of object (e.g., a light fixture that is a hanging light fixture), or by a specific name or description given to a particular object (e.g., fire extinguisher). To give an example, this translates to an elongated rectangular shape being labeled an HVAC duct or a part of a wall being labeled as a door. With the semantic information 32, such as these identifying annotations, the localizer 220 is able to confirm or validate the temporal nature of an object. In this respect, the localizer 220 identifies an object labeled a wall or a window as a permanent object PO.

In some examples, the localizer 220 infers that an object corresponding to a localization candidate 212 is a nonpermanent object NPO because the semantic model 30 (e.g., the semantic information 32) includes no reference to the object corresponding to a localization candidate 212. For instance, the semantic model 30 does not include any material or cardboard stacked on the floor within the model 30. Because these objects are not modeled in the semantic model 30, the localizer 220 determines that these objects are temporary in nature since the model 30 does not reflect any intention of them being present on the site.

In some implementations, to determine the permanence of an object corresponding to a localization candidate 212, the localizer 220 first determines a location for the perceived object corresponding to the localization candidate 212. In other words, the localizer 220 determines the location in the environment 10 where the sensor data 134 captured the object corresponding to the localization candidate 212. With the location of the object that relates to the localization candidate 212, the localizer 220 determines where this location occurs in the semantic model 30. In some examples, an operator 12 assists this process by indicating where a particular location in the semantic model 30 exists within the gathered sensor data 134 (or vice versa). Additionally or alternatively, the semantic planner 200 may perform a matching process that matches features from the sensor data 134 to features in the semantic model 30 in order to align the semantic model 30 and the sensor data 134. In either approach, the localizer 220 then determines whether the respective location in the semantic model 30 that matches the location of the perceived object from the sensor data 134 corresponds to a permanent object PO in the semantic model 30. Stated differently, the localizer 220 queries the semantic model 30 at a location in the semantic model 30 that corresponds to the perceived object from the sensor data 134 to determine whether semantic information 32 at that location in the semantic model 30 indicates that a permanent object PO exists in the semantic model 30 at that location. When the semantic information 32 at that location in the semantic model 30 indicates the presence of a permanent object PO, the localizer 220 enables or converts the localization candidate 212 to be a localization reference point 222 in the localization map 202

Figure 2C:
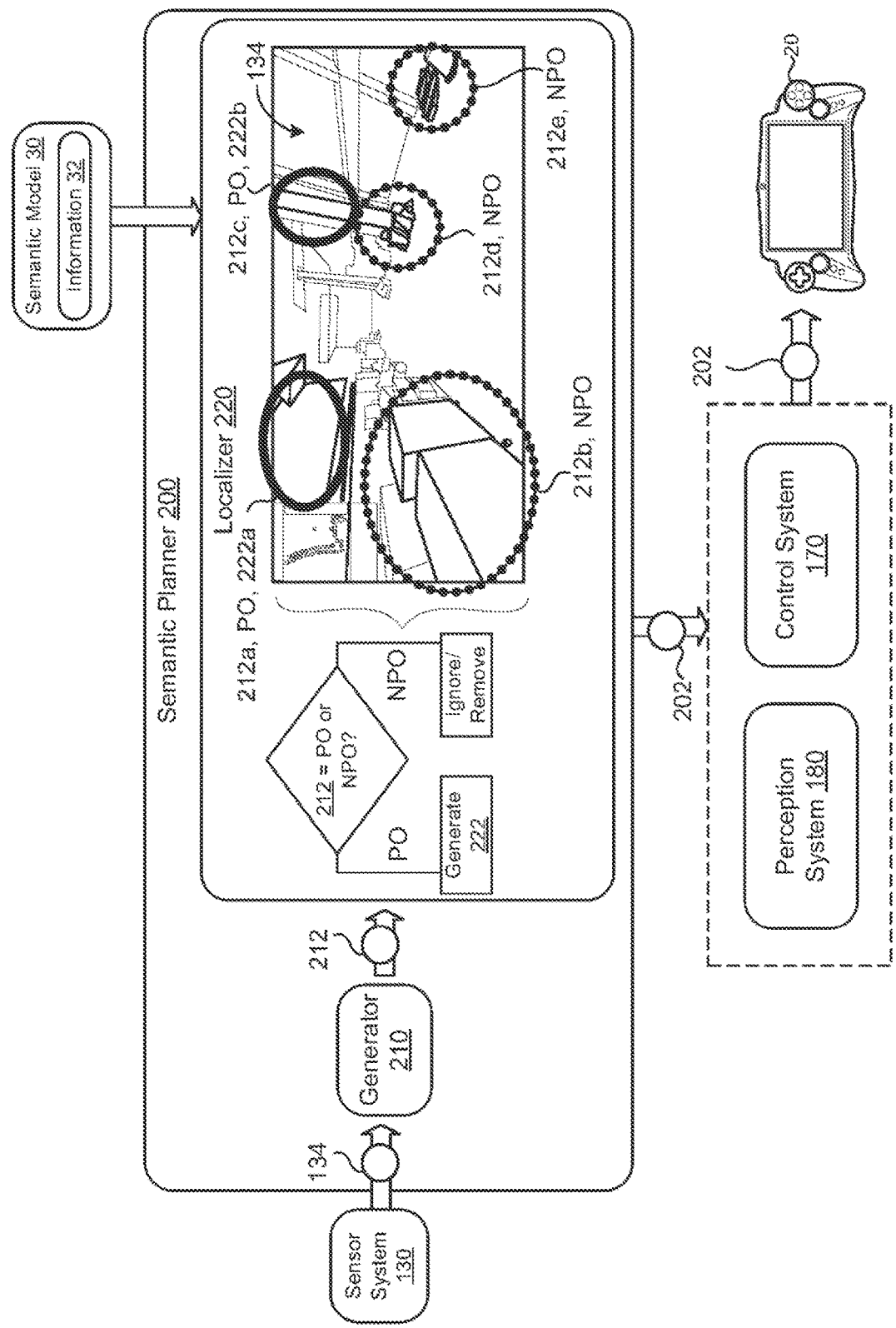

Referring to the example of FIG. 2C, when the generator 210 passes the five localization candidates 212a-e to the localizer 220, the localizer 220 determines that the first localization candidate 212a corresponds to a permanent object PO since the corresponding semantic information 32 identifies the first localization candidate 212a as being located at part of a wall. Based on this determination, the localizer 220 generates a first localization reference point 222a in the localization map 202 for the first localization candidate 212a. For the second, fourth, and fifth localization candidates 212b,d,e, the localizer 220 determines that these candidates 212 correspond to nonpermanent objects NPOs since the corresponding semantic information 32 has no permanent objects POs at these locations. For the third localization candidate 212c, the localizer 220 determines that the third localization candidate 212c corresponds to a permanent object PO since the corresponding semantic information 32 identifies the third localization candidate 212a as being located at part of pipe attached to a structural pillar. Based on this determination, the localizer 220 generates a second localization reference point 222b in the localization map 202 for the third localization candidate 212c.

Figure 2D:
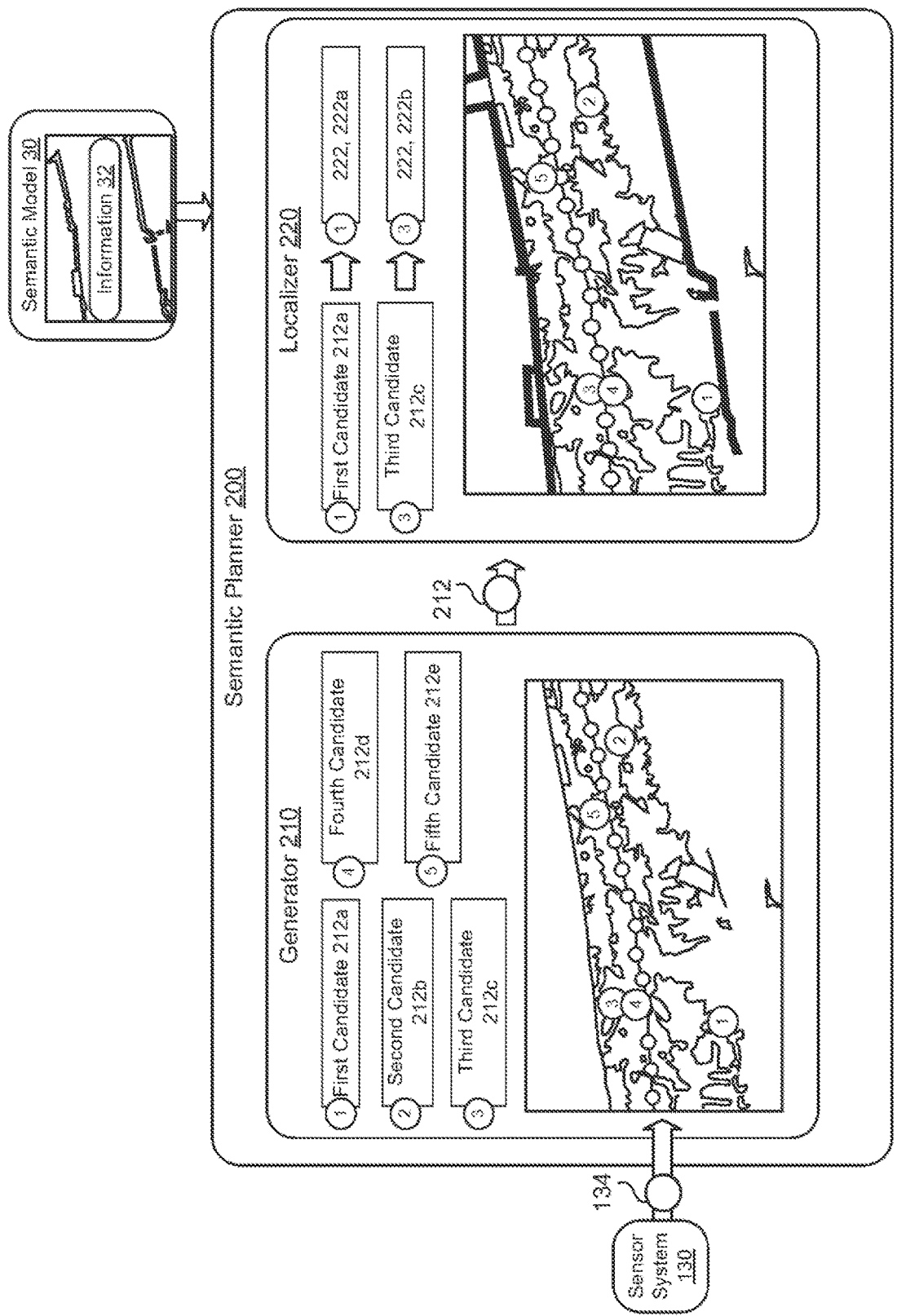

FIG. 2D is a variation of FIGS. 2B and 2C except that FIG. 2D depicts the image of the environment 10 as sensor data 134 from a top view. Here, the semantic model 30 indicates that the only the bolded outside edges are actually intended to be part of the environment 10 (i.e., intended to be permanent). This means that a majority of the sensor data 134 gathered by the robot 100 corresponds to nonpermanent objects NPOs. In light of this, only the first localization candidate 212a and the third localization candidate 212c correspond to permanent objects POs. This can be seen as the semantic model 20 is overlain on the sensor data 134 received at the generator 210 that forms the localization candidates 212, 212a-e. Much like FIGS. 2B and 2C, the localization candidates 212 that the semantic planner 200 will not be using as localization reference points 222 for the localization map 202 include the second localization candidate 212b, the fourth localization candidate 212d, and the fifth localization candidate 212e, while the localization candidates 212 that the semantic planner 200 will use as localization reference points 222 for the localization map 202 are the first localization candidate 212a and the third localization candidate 212c.

In some examples, the localizer 220 uses scheduling information from the semantic model 30 to determine whether an object corresponding to a localization candidate 212 is a permanent object PO. For instance, the semantic model 30 may indicate that during weeks 10 to 12 of a construction project, there will be scaffolding present in the environment 10 to perform some construction. In this situation, if the localizer 220 receives a localization candidate 212 that corresponds to some portion of the scaffolding, the localizer 220 uses the scheduling information to determine that the scaffolding is a nonpermanent object NPO in the semantic model 30. This means that the semantic model 30 may actually include a model of objects that the localizer 220 may interpret as permanent PO or nonpermanent NPO.

Furthermore, the semantic planner 200 may use the scheduling information from the semantic model 30 to instruct the robot 100 to capture sensor data 134 for a new permanent object PO that is installed in the environment 10. In this situation, the semantic planner 200 identifies that the scheduling information from the model 30 indicates a time when the new permanent object PO will be installed in the environment 10. Based on this scheduling information, the semantic planner 200 instructs the robot 100 to capture sensor data 134 for the new permanent object PO after a time when the scheduling information indicates the new permanent object PO will be installed. The semantic planner 200 may then update the localization map 202 based on the sensor data 134 captured for the new permanent object PO. Here, by utilizing the scheduling information, the robot 100 may avoid the need for additional programming by the operator 12 to capture sensor data updates that occur in the environment 10.

Optionally, the semantic planner 200 may use the scheduling information to temporarily close or block areas in the localization map 202. That is, the scheduling information may indicate that construction or fabrication is occurring in a particular area of the environment 10 at a particular time. When this occurs, the semantic planner 200 may prevent the robot 100 from using waypoints or navigational features corresponding to localization reference points 222 during that particular time in that particular area. With this technique, the semantic planner 200 may assist the robot's behaviors that occur at the action level. More particularly, since the action level maps 182 operate to engage or to avoid objects that are presently being perceived by the robot 100 in its immediate surroundings, the semantic planner 200 may feed the localization map 202 (e.g., at runtime) or information from the localization map 202 (e.g., like blocked areas or temporarily closed areas) to the perception system 180 to provide further information to these action level maps 182 or to generate (or modify) these action level maps 182. With greater information about the environment 10, the action level maps 182 are more likely to guide the robot 100 to perform a safe and an accurate action when the robot 100 reacts to its immediate surroundings.

In some cases, the semantic planner 200 may convey information about nonpermanent objects NPO to the perception system 180. With information about nonpermanent objects NPO from the semantic planner 200, the perception system 180 may be informed that an object, which the robot 100 encounters, is less likely to be terrain that the robot 100 may step on and more likely to be an obstacle that the robot 100 should avoid. In a more extreme example, the environment 10 may include a hole that is temporarily dug to connect sewer lines. In this example, the scheduling information of the semantic model 30 indicates that this hole is nonpermanent NPO. Although the semantic planner 200 may therefore not generate a localization reference point 222 for the hole, the semantic planner 200 may inform the perception system 180 that the hole will exist at some time for the benefit of the robot 100. Namely, by informing the perception system 180 that a hole will be present, the perception system 180 may configure the no step map 182b to include a no step region in the area corresponding to the hole. With this additional prior information, the perception system 180 may more intelligently configure the action level maps 182.

Furthermore, the semantic planner 200 may convey information about nonpermanent objects NPO and permanent objects PO to the control system 170, such as for instructing or informing controlled actions for the robot 100. Thus, for example, the control system 170 may be made aware of the locations of nonpermanent objects NPO and/or permanent objects PO within the localization map 202 and perform operations based on the locations. For instance, the control system 170 may receive a command from an operator 12 to capture sensor data 134 of an indicated category or class or type of object and, based on the received localization map 202, the control system 170, such as via the path generator 174, may navigate the robot 100 to each of the indicated objects within the environment 10 to capture the sensor data 134.

In some configurations, the robot 100 receives the semantic model 30 prior to any initial mapping process. Here, the semantic planner 200 may use the semantic model 30 to designate locations where the robot 100 should establish localization reference points 222. That is, the semantic planner 200 may select features from the semantic model 30 where the semantic planner 200 identifies permanent objects PO. With this approach, the robot 100 may then gather sensor data 134 at the locations that the semantic planner 200 selected in the environment 10. Additionally or alternatively, the semantic planner 200 may generate the localization map 202 based entirely on the semantic model 30 without gathering or processing sensor data 134 from the environment 10. That is, the semantic planner 200 uses the semantic model 30 to simulate the robot's initial drive through the environment 10. The semantic planner 200 may use these techniques to reduce the need to query specific locations in the semantic model 30 using the sensor data 134.

The semantic planner 200 may leverage the semantic information 32 to identify and to eliminate erroneous sensor data 134. To illustrate, when the robot 100 gathers sensor data 134, the systems of the robot 100 may identify or derive features and/or objects from the resulting sensor data 134. Unfortunately, some sensor data 134 may have the affinity to resemble an object or feature when that is not actually the case in the environment 10. One particular scenario where this may commonly occur is for lighting. When lighting casts shadows, the robot 100 may interpret the edges of the shadows or the shadows themselves as an object based on, for example, the contrast present in the sensor data 134. With semantic information 32, the semantic planner 200 may identify one or more sources of light and estimate or approximate shadows that would likely occur from these sources of light at a particular time of day when the sensor system 130 captured the sensor data 134. For example, the semantic information 32 identifies that a particular section of the environment 10 is a wall of windows on an east side of a building. With the dimensions of these windows from the semantic information 32, an orientation for the windows (e.g., on the east side of the building), and/or a time of day for the sensor data 134, the semantic planner 200 may determine that a previously identified feature or object is a shadow. Here, the semantic planner 200 may track the shadow, remove the presence of the shadow (e.g., remove the sensor data 134 corresponding to the shadow or shadow edges), or instruct further processing to disregard the shadow and its effects.

Figure 3:
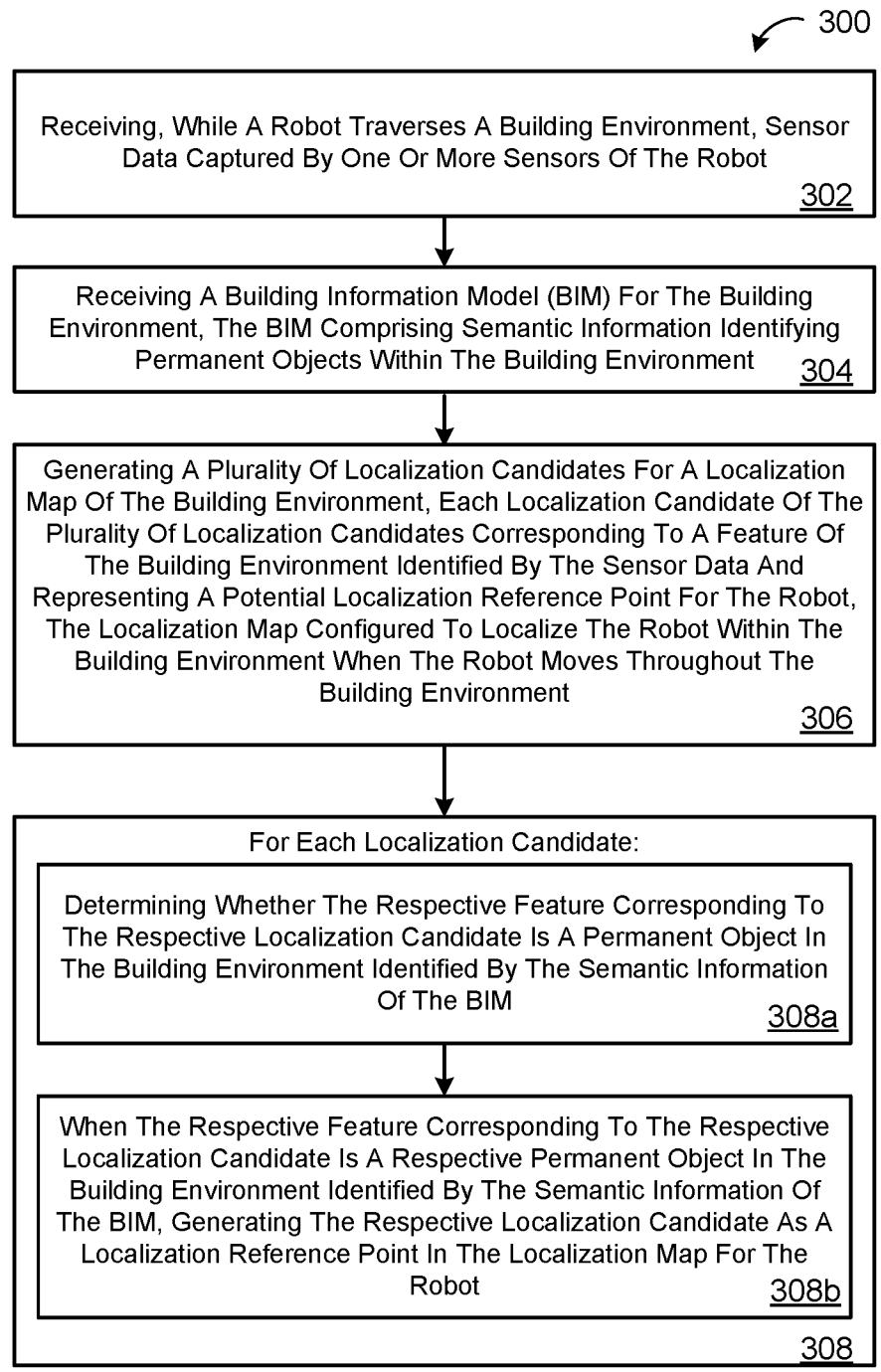
FIG. 3 is a flow chart of an example arrangement of operations for a method of using a semantic model for map generation.

FIG. 3 is a flowchart of an example arrangement of operations for a method 300 of using a semantic model 30 for map generation. At operation 302, the method 300 receives, while a robot 100 traverses an environment 10, sensor data 134 captured by one or more sensors 132 of the robot 100. At operation 304, the method 300 receives a semantic model 30 for the environment 10 where the semantic model 30 includes semantic information 32 identifying permanent objects POs within the environment 10. At operation 306, the method 300 generates a plurality of localization candidates 212 for a localization map 202 of the environment 10 where each localization candidate 212 of the plurality of localization candidates 212 corresponds to a feature of the environment 10 identified by the sensor data 134 and representing a potential localization reference point for the robot 100. Here, the localization map 202 is configured to localize the robot 100 within the environment 10 when the robot 100 moves throughout the environment 10. At operation 308, the method 300 performs two sub-operations 308, 308a-b. At operation 308a, the method 300 determines whether the respective feature corresponding to the respective localization candidate 212 is a permanent object PO in the environment 10 identified by the semantic information 32 of the semantic model 30. At operation 308b, when the respective feature corresponding to the respective localization candidate 212 is a respective permanent object PO in the environment 10 identified by the semantic information 32 of the semantic model 30, the method 300 generates the respective localization candidate 212 as a localization reference point 222 in the localization map 202 for the robot 100.

Figure 4:
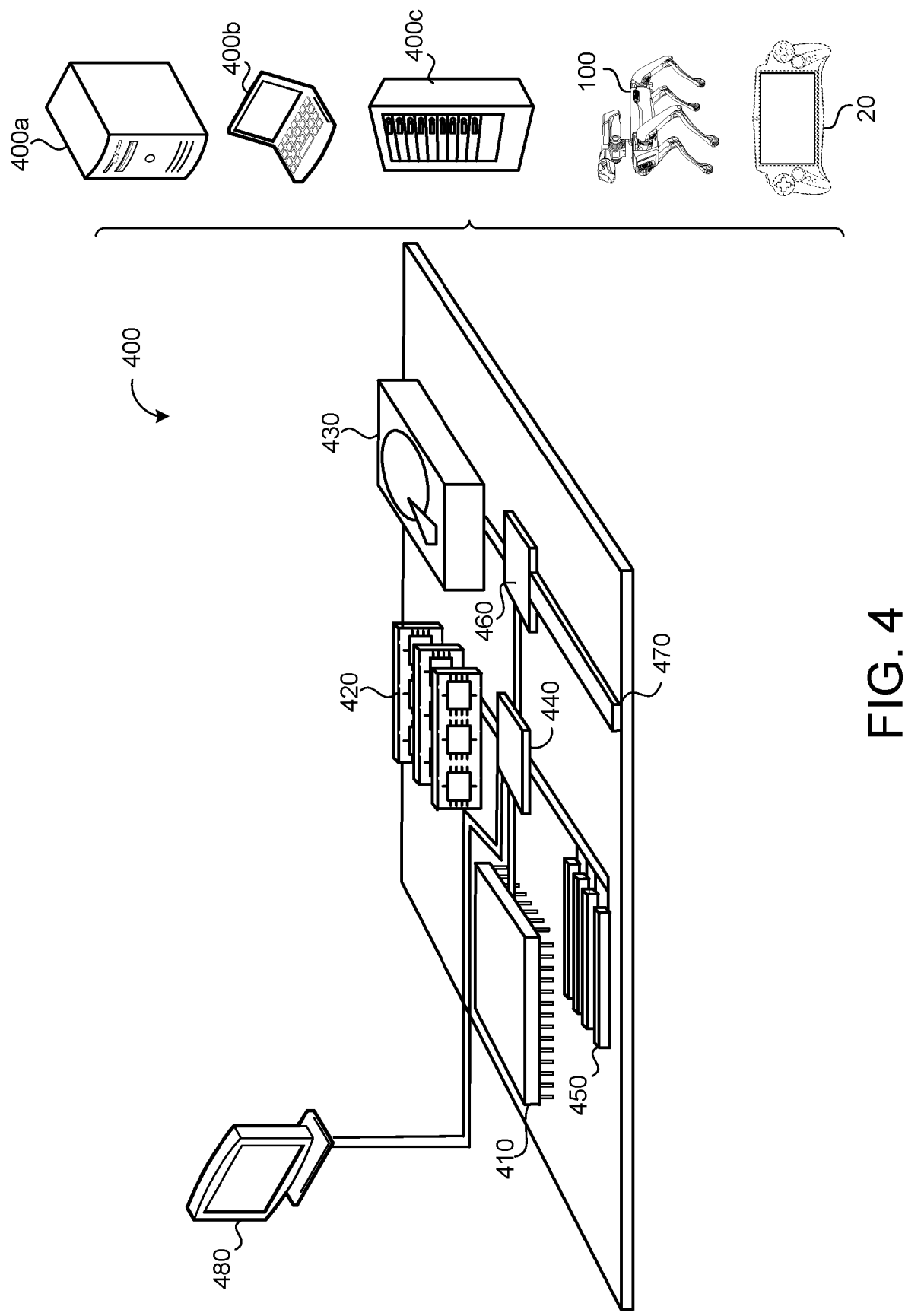
FIG. 4 is a schematic view of an example computing device that may be used to implement the systems and methods described herein.

FIG. 4 is schematic view of an example computing device 400 that may be used to implement the systems (e.g., the sensor system 130, the control system 170, the perception system 180, the semantic planner 200, and/or remote controller 20) and methods (e.g., method 300) described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410 (e.g., data processing hardware), memory 420 (e.g., memory hardware), a storage device 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, as part of a rack server system 400c, as a component of the robot 100, or as a component of the remote controller 20.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method comprising:
receiving, by data processing hardware of a robot, first sensor data from one or more sensors of the robot, the first sensor data corresponding to an environment;
receiving, by the data processing hardware, a semantic model associated with the environment, the semantic model comprising semantic information identifying one or more objects located within the environment;
identifying, by the data processing hardware, a first feature within the environment based on the first sensor data;
determining, by the data processing hardware, that the first feature as identified based on the first sensor data corresponds to an object of the one or more objects located within the environment and identified by the semantic information of the semantic model;
based on determining that the first feature as identified based on the first sensor data corresponds to the object, generating, by the data processing hardware, in a first map, a first localization reference point corresponding to the first feature;

generating, by the data processing hardware, in a second map, a first identifier of a no-step region or an obstacle corresponding to the first feature as identified based on the first sensor data, wherein the first sensor data, the first map, and the second map correspond to different features;

instructing, by the data processing hardware, localization of the robot within the environment using the first map, wherein instructing the localization of the robot comprises:
instructing, by the data processing hardware, identification of a subset of features as identified based on second sensor data that correspond to the first map, and
based on generating the first localization reference point in the first map and the identification of the subset of features as identified based on the second sensor data that correspond to the first map, instructing, by the data processing hardware, determination of a location of the robot relative to the first feature as identified based on the second sensor data; and instructing, by the data processing hardware, performance of an action by the robot based on the localization of the robot and using the second map.

2. The method of claim 1, wherein instructing the performance of the action comprises:
instructing autonomous navigation by the robot within the environment based on the localization of the robot.

3. The method of claim 1, further comprising:
providing the first map to a perception system of the robot.

4. The method of claim 1, wherein the semantic model further comprises schedule information, the schedule information indicating a time period associated with the object, the method further comprising:
instructing the robot to capture the first sensor data based on the time period.

5. The method of claim 1, wherein the semantic information includes one or more descriptors of the one or more objects located within the environment and identified by the semantic information of the semantic model, the method further comprising:
instructing the robot to capture the first sensor data based on the one or more descriptors.

6. The method of claim 1, wherein each of the first map, the second map, and the semantic model is a separate representation of the environment and wherein each of the first map, the second map, and the semantic model indicate different data associated with the environment.

7. The method of claim 1, further comprising:
communicating the first identifier of the no-step region or the obstacle to a step planning controller.

8. The method of claim 1, further comprising:
receiving, from a computing device, a task for the robot to perform, wherein instructing the performance of the action comprises:
instructing autonomous navigation by the robot within the environment based on the localization of the robot; and
instructing performance of the task by the robot based on the localization of the robot.

9. The method of claim 1, further comprising:
identifying one or more features within the environment based on the first sensor data;

comparing the one or more features as identified based on the first sensor data with the one or more objects located within the environment and identified by the semantic information of the semantic model; and removing, from the first map, one or more localization reference points corresponding to the one or more features as identified based on the first sensor data based on comparing the one or more features as identified based on the first sensor data with the one or more objects located within the environment and identified by the semantic information of the semantic model.

10. The method of claim 1, wherein the robot comprises four legs.

11. The method of claim 1, wherein the semantic model further comprises a three-dimensional representation of the environment.

12. A robot comprising:
a body;
one or more locomotion-based structures coupled to the body;
a sensor system at least partially disposed on the body;
data processing hardware in communication with the sensor system; and
memory hardware in communication with the data processing hardware, the memory hardware storing instructions that when executed on the data processing hardware cause the data processing hardware to:
receive first sensor data from the sensor system, the first sensor data corresponding to an environment;
receive a semantic model associated with the environment, the semantic model comprising semantic information identifying one or more objects located within the environment;
identify a first feature within the environment based on the first sensor data;
determine that the first feature as identified based on the first sensor data corresponds to an object of the one or more objects located within the environment and identified by the semantic information of the semantic model;
based on determining that the first feature as identified based on the first sensor data corresponds to the object, generate, in a first map, a first localization reference point corresponding to the first feature;
generate, in a second map, a first identifier of a no-step region or an obstacle corresponding to the first feature as identified based on the first sensor data, wherein the first sensor data, the first map, and the second map correspond to different features;
instruct localization of the robot within the environment using the first map, wherein to instruct the localization of the robot, execution of the instructions further causes the data processing hardware to:
instruct identification of a subset of features as identified based on second sensor data that correspond to the first map, and
based on generating the first localization reference point in the first map and the identification of the subset of features as identified based on the second sensor data that correspond to the first map, instruct determination of a location of the robot relative to the first feature as identified based on the second sensor data; and
instruct performance of an action by the robot based on the localization of the robot and using the second map.

13. The robot of claim 12, wherein to instruct the performance of the action, execution of the instructions further causes the data processing hardware to:
  instruct autonomous navigation by the robot within the environment based on the localization of the robot.

14. The robot of claim 12, wherein execution of the instructions further causes the data processing hardware to:
  provide the first map to a perception system of the robot.

15. The robot of claim 12, wherein the semantic model further comprises schedule information, the schedule information indicating a time period associated with the object, wherein execution of the instructions further causes the data processing hardware to:
  instruct the robot to capture the first sensor data based on the time period.

16. The robot of claim 12, wherein the semantic information includes one or more descriptors of the one or more objects located within the environment and identified by the semantic information of the semantic model, wherein execution of the instructions further causes the data processing hardware to:
  instruct the robot to capture the first sensor data based on the one or more descriptors.

17. The robot of claim 12, wherein each of the first map, the second map, and the semantic model is a separate representation of the environment and wherein each of the first map, the second map, and the semantic model indicate different data associated with the environment.

18. The robot of claim 12, wherein the execution of the instructions further causes the data processing hardware to:
  communicate the first identifier of the no-step region or the obstacle to a step planning controller.

19. The robot of claim 12, wherein execution of the instructions further causes the data processing hardware to:
  receive, from a computing device, a task for the robot to perform,
wherein to instruct the performance of the action, the execution of the instructions further causes the data processing hardware to:
  instruct autonomous navigation by the robot within the environment based on the localization of the robot; and
  instruct performance of the task by the robot based on the localization of the robot.

20. The robot of claim 12, wherein execution of the instructions further causes the data processing hardware to:
  identify one or more features within the environment based on the first sensor data;
  compare the one or more features as identified based on the first sensor data with the one or more objects located within the environment and identified by the semantic information of the semantic model; and
  remove, from the first map, one or more localization reference points corresponding to the one or more features as identified based on the first sensor data based on comparing the one or more features as identified based on the first sensor data with the one or more objects located within the environment and identified by the semantic information of the semantic model.

21. The robot of claim 12, wherein the one or more locomotion-based structures comprise four legs.

22. The robot of claim 12, wherein the semantic model further comprises a three-dimensional representation of the environment.

23. The method of claim 1, wherein the first map comprises a localization level map generated by a first system of the robot, and wherein the second map comprises an action level map generated by a second system of the robot that is different from the first system.

24. The method of claim 1, wherein a second localization reference point corresponding to a second feature, as identified based on the first sensor data, is removed from the first map based on the semantic information of the semantic model, and wherein the second map comprises a second identifier of a no-step region or an obstacle corresponding to the second feature.

\* \* \* \* \*